United States Patent [19]

Dethlefs

[11] Patent Number: 5,114,990

[45] Date of Patent: May 19, 1992

[54] PROCESS FOR THE PRODUCTION OF PIGMENT/PLASTIC PREMIXES

[75] Inventor: Ralf-Burkhard Dethlefs, Osnabruck, Fed. Rep. of Germany

[73] Assignee: Felix Schoeller Jr. GmbH KG, Fed. Rep. of Germany

[21] Appl. No.: 522,068

[22] Filed: May 4, 1990

Related U.S. Application Data

[63] Continuation of Ser. No. 311,144, Dec. 15, 1989, abandoned.

[30] Foreign Application Priority Data

Feb. 16, 1988 [DE] Fed. Rep. of Germany ....... 3804775

[51] Int. Cl.$^5$ ................................................ C08K 9/00
[52] U.S. Cl. ..................................... 523/200; 524/706; 524/783; 524/785; 524/836; 524/847; 524/855; 526/96; 526/97; 526/101; 526/103; 526/104; 526/106; 526/107; 526/123; 526/129; 526/156; 428/407
[58] Field of Search .................... 523/200; 526/96, 97, 526/101, 103, 104, 106, 107, 123, 129, 156; 524/836, 847, 706, 783, 785, 855

[56] References Cited

U.S. PATENT DOCUMENTS

| | | | |
|---|---|---|---|
| 3,068,185 | 12/1962 | Stamberger | 524/789 |
| 3,166,542 | 1/1965 | Orzechowski et al. | 526/97 |
| 3,202,645 | 8/1965 | Yancey | 526/97 |
| 4,564,647 | 1/1986 | Hayashi et al. | 523/211 |
| 4,650,747 | 3/1989 | Uno et al. | 430/536 |
| 4,665,143 | 5/1987 | Ahluwalia et al. | 526/88 |
| 4,771,086 | 9/1988 | Martin | 523/205 |

FOREIGN PATENT DOCUMENTS 60-75832 4/1985 Japan.

OTHER PUBLICATIONS

N. W. Johnson et al. "Growth of Polymers from Substrates," Polym. Prep. Soc. Div., Polym. Chem., vol. 17, No. 2 p. 491 (1976).

*Primary Examiner*—Paul R. Michl
*Assistant Examiner*—John J. Guarriello
*Attorney, Agent, or Firm*—Allegretti & Witcoff, Ltd.

[57] ABSTRACT

There is described a process for the production of pigment/plastic premixes characterized by homogeneous distribution of pigment in a polymer matrix. The invention is based on the polymerization of olefins carried out by means of a process using Ziegler catalyst. Significantly the polymerization occurs on the surface of the pigment particles, after the prior activation of the pigment particles.

32 Claims, 1 Drawing Sheet 5,114,990

PROCESS FOR THE PRODUCTION OF PIGMENT/PLASTIC PREMIXES

This application is a continuation of Ser. No. 07/311,144 filed Dec. 15, 1989, now abandoned.

BACKGROUND OF THE INVENTION

The invention relates to a process for the production of pigment/plastic premixes.

As is generally known, titanium dioxide is the most frequently used pigment in the pigmenting of various synthetic products. It can be applied in the forms referred to as rutile or anatase modifications. It can also, however, subsequently be surface treated with $SiO_2$ or $Al_2O_3$. In addition to titanium dioxide, other inorganic, oxidic pigments such as cobalt blue and cobalt violet also find general application.

A condition for the full development of pigment characteristics in a polymer matrix as well as for disturbance-free processing of the pigment polymer compositions, is the complete destruction of the pigment agglomerates and the homogeneous distribution of the pigment particles in the polymer. This is particularly important in the production of thin coatings or foils (generally between 25–50$\mu$ thickness), since agglomeration of pigment may disadvantageously lead to the formation of holes, and thus to the tearing of the foils. A good dispersion is therefore necessary to avoid this problem.

For the pigmentation of polyolefin compositions therefore, pigments are not applied as such, but rather in form of pigment/plastic premixes, the so-called "master batches", in which the pigment is present in a form already dispersed. The production of such master batches takes place in a special operational process. Typically suited for this purpose are kneading machines, roller mills and extruders.

According to the presently existing state of the art, various methods for the production of master batches have been proposed (for example, U.S. Pat. No. 4,650,747; JP 60-75 832). All methods are characterized in that they require the use of dispersing agents (for example, salts or esters of higher fatty acids, such as stearates) and the treatment of the titanium dioxide surface by means of organic or inorganic agents (such as, for example, alkyl titanate, alkanolamine, alkylpolysiloxane, and zircoaluminate).

The above-stated methods are disadvantageous in that, despite the use of dispersing agents and other auxiliary agents, complete homogeneous distribution of the pigment particles is not achieved.

The treatment of the pigment particles with various auxiliary agents seems, above all, to be inferior. Evidently, the pigment particles are only incompletely encased by the auxiliary agents and, at least in part for this reason, optimal dispersion is not attained. Pigment agglomerates that remain become noticeable in the extrusion coating, for example by a high sieve residue, obstruction of the nozzles, or holes and tears in the resulting film.

Furthermore, the agglomeration of dispersed particles sets a limit to the pigment concentration in the composition. As a result, the desired or necessary concentrations of pigments can frequently not be attained.

One further disadvantage lies in the application of the dispersing agents themselves. These can exude out of a coating and precipitate on the surface of the foil or film. This results in difficulties in the further processing of the polyolefin coatings or polyolefin parts.

It is generally known that a polymerization can take place on the surface of a polymer body or solid substance, resulting in the encasement of the body or substance. See, for example, the encasement of glass beads with polyacrylonitrile (N. W. Johnston et al, Polym. Prep. Amer. Chem. Soc. Div., Polym. Chem., Vol. 17, number 2, 1976, page 491). In this case, the polymerization is initiated by means of radical initiators.

In the attempt to transfer such a process to pigments, such as, for example $TiO_2$, most particles of the pigment were encased by the polymer. However, the disturbances already mentioned in the extrusion coating caused by high portions of pigment agglomerates appeared to be unchanged. In order to obtain a satisfactory distribution of the pigments, usual quantities of auxiliary agents had to be employed.

GENERAL SUMMARY OF THE INVENTION

The invention provides a process by means of which it is rendered successfully possible to ensure a good distribution of pigments in a polyolefin matrix and to ensure a disturbance-free processing of the polymer composition, for example, into a thin film or foil, and to minimize or eliminate the use of dispersing agents to the greatest extent possible.

In order to solve this task according to the invention, a process is proposed in which the polymerization of ethylene, alone as well as with other alpha-olefins, takes place on the surface of the pigment particles to encapsulate the pigment, whereby the polymerization and associated encapsulation takes place after the surface of the pigment particles has been activated by the addition of a compound of a transition element of the IV to VIII secondary group of the periodic system. After activation, the polymerization takes place on the surface of an inorganic oxidic pigment through the application of a metallo-organic catalyst system.

The process in accordance with the invention described here has the following advantages:
No appearance of pigment agglomerates during the production of the master batches;
Homogeneous distribution of pigment particles in the polymer;
Complete disintegration of pigment agglomerates which are possibly present;
Elimination of dispersing and other auxiliary agents.

DETAILED DESCRIPTION OF THE INVENTION

The process of this invention contemplates the use of the Ziegler or Phillips catalyst systems, such as the following, for example:
$TiCl_3/Al(C_2H_5)_3$;
$TiCl_4/MgCl_2/Al(C_2H_5)_3$;
$TiCl_4/MgCl_2/Al(i-C_4H_9)_3$;
$TiCl_4/Mg(OC_2H_5)_2/Al(C_2H_5)_3$;
$TiCl_4/Mg(OC_2H_5)_2/Al(i-C_4H_9)_3$;
$TiCl_4/Al(C_2H_5)_2H$;
$Ti(OC_2H_5)_4/Al(C_2H_5)_3$;

$VCl_4/Al(C_2H_5)_3$;
$VCl_4/Al(C_2H_5)_2Cl$;
$VOCl_3/Al(i-C_4H_9)_2Cl$;
$VOCl_3/Al(C_2H_5)_2Cl$;
$(C_6H_5)_2Zr(CH_3)_2$/aluminum oxane;
$(C_6H_5)_2ZrCl_2$/aluminum oxane;
$CrO_3/SiO_2$;
$Zr(C_2H_5)_3Cl/SiO_2$;
as well as others.

In a preferred process, the pigment is suspended in a solvent, such as, for example, a hydrocarbon mixture. The pigment surface is activated in the manner mentioned, and then a gaseous olefin is added. After saturation of the suspension with the olefin, the catalyst system is added in order to initiate the desired polymerization.

The polymerization reaction can, however, also be started before the suspension has been saturated with olefin.

A preferred olefin for use in the process is ethylene or an ethylene/alpha-olefin mixture. A small portion of a fluid or solid alpha-olefin can also be added to the suspension before addition of the gaseous olefin.

The Ti-, V-halogenides, and the combinations of both of these are particularly suitable compounds for the activation of the pigment surface. Titanium ester chlorides and various zirconium compounds, such as, for example, biscyclopentadienyl zirconium dimethyl, are suitable for the activation.

Among inorganic oxidic pigments, there are, for example, all titanium dioxide modifications, with or without inorganic and/or organic surface-treatment, $ZrO_2$, cobalt blue, cobalt violet, and other mixed oxides, such as alkaline earth titanates or Zn-titanate.

Surprisingly, the performance of polymerization according to this invention leads to a very homogeneous distribution of the pigment particles. It is believed that the chain growth of the polymer takes place not only externally on the surface of the pigment, but also within its pores, by which disintegration of the pigment particle is caused. The pigment fragments caused by such disintegration also appear to be completely encased by the polymer.

Figure 1A:
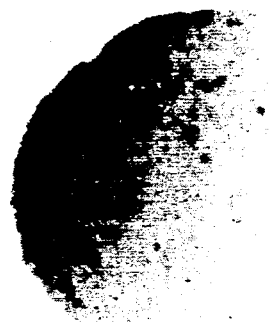
FIG. 1 qualitatively depicts the pigment distribution in the polymer matrix of the samples obtained in comparative examples A, B, C.
Figure 1B:
Figure 1C:
Figure 2A:
FIG. 2 depicts the distribution of pigment in the polymer matrix in the samples obtained in examples 1 and 7.
Figure 2B:
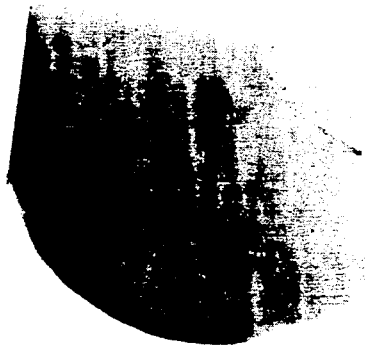

In the first instance, however, the encasement or encapsulation of the pigment occurs after the activation of the pigment surface in accordance with the invention. The activating compound can be at least one component of the catalyst system. The start of polymerization occurs thereafter, through the addition of the catalyst system. The superior effect of the invention is evident from FIGS. 2a and 2b, following Example 7.

Equally satisfactory results were observed in the copolymerization of the ethylene with other olefins. In this, the alpha-olefin can be applied with a chain length of up to approximately $C_{26}$–$C_{28}$.

The regulation of the molecular weight of the polymerization attained during the polymerization can take place in the usual manner, through the use, for example, of hydrogen as a regulator substance.

EXAMPLES OF EXECUTION

EXAMPLE 1

100 g of titanium dioxide (Rutile 2073 type, manufactured by Kronos) and 1.5 l of toluene (dried by means of a molecular sieve) were introduced under a nitrogen atmosphere into a 2 liter glass reaction vessel.

The suspension was heated, during agitation, to 80° C., 1.1 g of $TiCl_4$ as a surface activator added, and subsequently saturated with ethylene. After saturation has taken place, the polymerization was initiated through the addition of a modified Ziegler catalyst system in a concentration of $1\times10^{-4}$ mol/l (relative to the titanium content), whereby ethylene was further introduced. The catalyst system used here was prepared in the manner known to those of skill in the art, such as taught in DE 1,795,197, the teachings of which are incorporated here by reference; it is based on $Mg(OC_2H_5)_2/TiCl_4/Al(i-C_4H_9)_3$ with a molar ratio of Al/Ti=125. The polymerization took place at 80° C., an ethylene pressure of 1.15 bar (total pressure=1.5 bar), and an agitator speed of 1250 RPM.

The ethylene concentration amounted to approximately 0.08 mol/l and could be calculated from the ethylene partial pressure.

The polymerization was stopped by interruption of the addition of ethylene, after 100 g of polyethylene had formed. The reaction product (white powder) was filtered off, washed with acetone, and vacuum dried at 60° C.

EXAMPLE 2

The process was carried out as in Example 1, but 0.25 mol/l hexene-1 was added to the suspension in the reactor before the beginning of the polymerization.

The polymerization was stopped after 100 g of polymer had formed. The copolymer contained 4.5 mol % of hexene-1.

EXAMPLE 3

The process was carried out as in Example 1, but 0.25 mol/l of octene-1 was added to the suspension in the reactor before the beginning of polymerization.

The polymerization was stopped after 100 g of polymer had formed. The copolymer contained 2.5 mol % of octene-1.

EXAMPLE 4

The process was carried out as in Example 1, but 0.25 mol/l of tetradecene-1 was added to the suspension in the reactor before the beginning of the polymerization. The copolymer contained 1.5 mol % of tetradecene-1.

EXAMPLE 5

The process was carried out as in Example 1, but 0.25 mol/l of octadecene-1 was added to the suspension in the reactor before the beginning of the polymerization. The copolymer contained 1.5 mol % of octadene-1.

EXAMPLE 6

The process was carried out as in Example 1, but the suspension was mixed in the reactor with 1.1 g $VCl_4$ as surface activator, and subsequently saturated with ethylene. The polymerization was started by addition of the [$VCl_4/Al(C_2H_5)_2Cl$]-catalyst in a concentration of $1\times10^{-4}$ mol/l, relative to the V-content.

EXAMPLE 7

The process was carried out as in Example 1, but 100 g of cobalt blue was used as a pigment.

COMPARATIVE EXAMPLES

A. The process was carried out as in Example 1, but the reaction was started, however, without surface activation.

B. The process was carried out as in Example 1, but the polymerization was started with 0.6 g of t-butyl-peroxide maleic acid.

C. For purposes of comparison, reference was made to a master batch of the type generally available commercially (with the use of stearates as auxiliary dispersing agents).

The pigment premixes obtained in the Examples A, B, and described in C were compressed into thin discs at 180° C., and X-ray exposures were made of these.

FIG. 1 a) Sample in accordance with comparative Example A;
b) Sample in accordance with comparative Example B;
c) Sample in accordance with comparative Example C.

FIG. 2 a) Sample in accordance with Example 1;
b) Sample in accordance with Example 7.

The foregoing description provides general information and defines preferred embodiments of the invention. However, other variations and modification of the invention are possible within the scope and contribution of the invention. Therefore this patent is to be limited only by the following claims and their equivalents.

What is claimed is:

1. A process for the production of pigment/plastic premixes comprising, in sequence:
    a) activating the surface of inorganic oxide pigment particles using a compound containing an element selected from the transition elements of the IV to VIII secondary groups of the periodic table;
    b) introducing a selected olefin; and
    c) initiating a polymerization reaction by introducing a metallo-organic catalyst system using a compound containing an element selected from the transition elements of the IV to VIII secondary group of the periodic table as well as a metallo-organic compound containing an element selected from the elements of the I to III groups.

2. A process in accordance with claim 1, wherein the surface of the pigment particles is activated by using at least one component of the catalyst system before the catalyst system is brought in contact with the pigment particles.

3. A process in accordance with claim 1, wherein the surface of the pigment particles is activated by using titanium- and/or vanadium halogenides.

4. A process in accordance with claim 1, wherein the surface of the pigment particles is activated by using titanium ester chlorides or titanium tetrachloride.

5. A process in accordance with claim 1, wherein the surface of the pigment particles is activated by using biscylcopentadienyl zirconium dimethyl or -dichloride or -diphenyl.

6. A process in accordance with claim 1, wherein the polymerization is carried out by means of a modified Ziegler or Phillips catalyst system.

7. A process in accordance with claim 1, wherein the modified Ziegler catalyst system [Mg(OC$_2$H$_5$)$_2$/TiCl$_4$/Al(i-C$_4$H$_9$)$_3$] is used.

8. A process in accordance with claim 1, wherein a titanium dioxide is used as the pigment.

9. A process in accordance with claim 1, wherein titanium dioxide in the rutile form is used as the pigment.

10. A process in accordance with claim 1, wherein titanium dioxide in the anatase form is used as the pigment.

11. A process in accordance with claim 1, wherein a titanium dioxide treated with aluminum oxide is used as the pigment.

12. A process in accordance with claim 1, wherein a titanium dioxide treated with silicon dioxide is used as the pigment.

13. A process in accordance with claim 1, wherein cobalt blue is used as the pigment.

14. A process in accordance with claim 1, wherein cobalt violet is used as the pigment.

15. A process in accordance with claim 1, wherein ethylene is the olefin used for the polymerization.

16. A process in accordance with claim 1, wherein the polymerization is carried out in the presence of an alpha-olefin.

17. A process in accordance with claim 1, wherein the surface of the pigment particles is activated by using one component of the catalyst system before the catalyst system is brought in contact with the pigment particles.

18. A process in accordance with claim 17, wherein the surface of the pigment particles is activated by using titanium and/or vanadium halogenides.

19. A process in accordance with claim 17, wherein the surface of the pigment particles is activated by using titanium ester chlorides or titanium tetrachloride.

20. A process in accordance with claim 17, wherein the surface of the pigment particles is activated by using biscylcopentadienyl zirconium dimethyl or -dichloride or -diphenyl.

21. A process in accordance with claim 1, wherein the polymerization is carried out by means of a Ziegler or Phillips catalyst system.

22. A process in accordance with claim 21 wherein the Ziegler or Phillips catalyst system is a member selected from the group consisting of:
TiCl$_3$/Al(C$_2$H$_5$)$_3$,
TiCl$_4$/MgCl$_2$/Al(C$_2$H$_5$)$_3$,
TiCl$_4$/MgCl$_2$/Al(i-C$_4$H$_9$)$_3$,
TiCl$_4$/Mg(OC$_2$H$_5$)$_2$/Al(C$_2$H$_5$)$_3$,
TiCl$_4$/Mg(OC$_2$H$_5$)$_2$/Al(i-C$_4$H$_9$)$_3$,
TiCl$_4$/Al(C$_2$H$_5$)$_2$H,
Ti(OC$_2$H$_5$)$_4$/Al(C$_2$H$_5$)$_3$,
VCl$_4$/Al(C$_2$H$_5$)$_3$,
VCl$_4$/Al(C$_2$H$_5$)$_2$Cl,
VOCl$_3$/Al(i-C$_4$H$_9$)$_2$Cl,
VOCl$_3$/Al(C$_2$H$_5$)$_2$Cl,
(C$_6$H$_5$)$_2$Zr(CH$_3$)$_2$/aluminum oxane,
(C$_6$H$_5$)$_2$ZrCl$_2$/aluminum oxane,
CrO$_3$/SiO$_2$ and
Zr(C$_2$H$_5$)$_3$Cl/SiO$_2$.

23. A process in accordance with claim 21, wherein the Ziegler catalyst system [Mg(OC$_2$H$_5$)$_2$/TiCl$_4$/Al(i-C$_4$H$_9$)$_3$] is used.

24. A process in accordance with claim 1, wherein a titanium dioxide is used as the pigment.

25. A process in accordance with claim 24, wherein titanium dioxide in the rutile form is used as the pigment.

26. A process in accordance with claim 24, wherein titanium dioxide in the anatase form is used as the pigment.

27. A process in accordance with claim 24, wherein a titanium dioxide treated with aluminum oxide is used as the pigment.

28. A process in accordance with claim 24, wherein a titanium dioxide treated with silicon dioxide is used as the pigment.

29. A process in accordance with claim 1, wherein cobalt blue is used as the pigment.

30. A process in accordance with claim 1, wherein cobalt violet is used as the pigment.

31. A process in accordance with claim 1, wherein said olefin is an alpha-olefin.

32. A process in accordance with claim 1, wherein said olefin is ethylene.

* * * * *